US007668764B2

(12) United States Patent
Wilson

(10) Patent No.: US 7,668,764 B2
(45) Date of Patent: Feb. 23, 2010

(54) SPENDING VEHICLES FOR PAYMENTS

(75) Inventor: Robert D. Wilson, Shawnee, KS (US)

(73) Assignee: H&R Block Tax Services LLC, Kansas City, MO (US)

( * ) Notice: Subject to any disclaimer, the term of this patent is extended or adjusted under 35 U.S.C. 154(b) by 211 days.

(21) Appl. No.: 11/423,824

(22) Filed: Jun. 13, 2006

(65) Prior Publication Data
US 2006/0218095 A1 Sep. 28, 2006
US 2009/0210342 A9 Aug. 20, 2009

Related U.S. Application Data

(63) Continuation of application No. 09/483,537, filed on Jan. 14, 2000, now Pat. No. 7,072,862, and a continuation-in-part of application No. 09/354,870, filed on Jul. 16, 1999, now Pat. No. 7,177,829.

(51) Int. Cl.
*G06F 17/22* (2006.01)
*G07F 19/00* (2006.01)
*G06Q 40/00* (2006.01)

(52) U.S. Cl. .......................................... 705/31; 705/35
(58) Field of Classification Search .................. 705/35, 705/36 R, 36 T, 39, 40, 14; 235/379
See application file for complete search history.

(56) References Cited

U.S. PATENT DOCUMENTS

| 3,596,256 A | 7/1971 | Alpet |
| 4,718,009 A | 1/1988 | Cuervo |
| 4,890,228 A | 12/1989 | Longfield |
| 5,025,138 A | 6/1991 | Cuervo |
| 5,025,372 A | 6/1991 | Burton et al. |
| 5,138,549 A | 8/1992 | Bern |

(Continued)

FOREIGN PATENT DOCUMENTS

WO     WO 98/04987     2/1998

(Continued)

OTHER PUBLICATIONS

Kemp, "Discover Debuts It's First Platinum card", DM News, Jan. 4, 1999, p. 2.*

(Continued)

*Primary Examiner*—Kelly Campen
(74) *Attorney, Agent, or Firm*—Standley Law Group LLP

(57) ABSTRACT

A system and method for associating payments with spending vehicles so that an individual who is entitled to receive periodic or special payments such as social security checks receives in place of the payment a spending vehicle such as a discount card, rebate, or coupon for use with purchases of the sponsor's products or services. Sponsors include companies and organizations interested in offering purchase incentives to their customers. An individual who wishes to receive a spending vehicle rather than the regular payment selects the spending vehicle he or she would like to receive. The individual then assigns his or her right to receive the payment to a third party. The third party then arranges to give a spending vehicle to the individual and to transfer the individual's payment to the sponsor of the spending vehicle. The third party may take a portion of the payment as compensation for the service.

12 Claims, 5 Drawing Sheets

U.S. PATENT DOCUMENTS

| | | | |
|---|---|---|---|
| 5,193,057 A | 3/1993 | Longfield | |
| 5,206,803 A | 4/1993 | Vitagliano | |
| 5,394,487 A | 2/1995 | Burger et al. | |
| 5,420,926 A * | 5/1995 | Low et al. | 705/74 |
| 5,536,045 A | 7/1996 | Adams | |
| 5,644,727 A | 7/1997 | Atkins | |
| 5,724,523 A | 3/1998 | Longfield | |
| 5,739,512 A | 4/1998 | Tognazzini | |
| 5,745,706 A * | 4/1998 | Wolfberg et al. | 705/35 |
| 5,772,251 A | 6/1998 | Fleck | |
| 5,787,404 A | 7/1998 | Fernandez-Holmann | |
| 5,787,405 A | 7/1998 | Gregory | |
| 5,878,405 A | 3/1999 | Grant et al. | |
| 5,903,876 A | 5/1999 | Hagemier | |
| 5,926,800 A | 7/1999 | Baronowski et al. | |
| 5,946,668 A | 8/1999 | George | |
| 5,963,921 A | 10/1999 | Longfield | |
| 5,991,736 A | 11/1999 | Ferguson et al. | |
| 5,991,744 A | 11/1999 | DiCresce | |
| 6,003,016 A | 12/1999 | Hagemier | |
| 6,019,283 A | 2/2000 | Lucero | |
| 6,064,983 A | 5/2000 | Koehler | |
| 6,070,153 A | 5/2000 | Simpson | |
| 6,105,007 A | 8/2000 | Norris | |
| 6,105,865 A | 8/2000 | Hardesty | |
| 6,182,891 B1 | 2/2001 | Furuhashi et al. | |
| 6,185,683 B1 | 2/2001 | Ginter et al. | |
| 6,202,052 B1 | 3/2001 | Miller | |
| 6,347,305 B1 | 2/2002 | Watkins | |
| 6,405,182 B1 | 6/2002 | Cuervo | |
| 6,473,500 B1 | 10/2002 | Risafi et al. | |
| 6,473,741 B1 | 10/2002 | Baker | |
| 6,532,450 B1 | 3/2003 | Brown et al. | |
| 6,546,373 B1 | 4/2003 | Cerra | |
| 6,625,582 B2 | 9/2003 | Richman et al. | |
| 6,829,588 B1 | 12/2004 | Stoutenburg et al. | |
| 7,010,507 B1 * | 3/2006 | Anderson et al. | 705/31 |
| 7,070,507 B2 | 7/2006 | Nishiumi et al. | |
| 7,072,862 B1 * | 7/2006 | Wilson | 705/31 |
| 7,117,172 B1 | 10/2006 | Black | |
| 7,127,425 B1 * | 10/2006 | Wilson | 705/38 |
| 7,177,829 B1 * | 2/2007 | Wilson et al. | 705/31 |
| 2002/0046110 A1 | 4/2002 | Gallagher | |
| 2003/0167225 A1 | 9/2003 | Adams | |
| 2004/0199422 A1 | 10/2004 | Napier et al. | |
| 2007/0050277 A1 * | 3/2007 | Wilson | 705/35 |
| 2007/0136160 A1 * | 6/2007 | Wilson et al. | 705/31 |

FOREIGN PATENT DOCUMENTS

| | | |
|---|---|---|
| WO | WO 00/22494 | 4/2000 |
| WO | WO 00/42583 | 7/2000 |
| WO | WO 01/15031 | 3/2001 |
| WO | WO 01/39077 | 5/2001 |

OTHER PUBLICATIONS

"Dicover's Platinum May Stand Out in the Platinum Crowd", Credit Card News, Jan. 15, 1999.*
Mannix, "It's payback time", U.S. News World & Report, 1994, vol. 117, No. 11, p. 77.
Kemp, "Discover Debuts It's First Platinum card", DM News, Jan. 4, 1999, p. 2.
"Discover's Platinum May Stand Out in the Platinum Crowd", Credit Card News, Jan. 15, 1999.
"Your Platinum Partner Certificate has Arrived", Discover Financial Services, Inc., date unknown.
Union Bank Offers Assistance Program for Customers Affected by Southland Fires, Business Wire, Oct. 29, 1993.
First Interstate Bank Will Donate $1 Million to Earthquake Victims, PR Newswire, p0118LA025, Jan. 18, 1994.
Taxless Innovations Give Postal Service Run for its Money, PR Newswire, 0309SD005, Mar. 9, 1990.
Giovetti, How to file your Tax Return Electronically, Compute, v 15 n4, pS9(3), Apr. 1993.
Gellis, Harold C., "How to Get Plugged into Electronic Tax Filing", Journal of Accountancy v17n66PP56-60, Jun. 1991, Dialog file 15 Accession No. 00553977.
Ryan Donmeyer, IRS Takes Aim at RAL Fraud, Hits Return Preparer Profits, 66 Tax Notes 1088 (Feb. 20, 1995).
Daniel Dunaief, Mellon Leads $1.25B Loan to Underpin H&R Block's Tax Refund Loan Program, AM. Banker, Nov. 7, 1996, at 20.
Electronic Tax filing: fast track to fraud?, Bank Tech. News, Sep. 1995, at 6.
Electronic Transfer Account: Frequently Asked Questions, http://www.etafind.gov/ETAFactsPage5.cfm.
Electronic Transfers: Use by Federal Payment Recipients Has Increased but Obstacles to Greater Participation Remain: General Accounting Office Rep. to the Subcomm. on Oversight and Investigations ofthe H Comm. on Financial Services, GAO-02-913 (Sep. 2002).
Gregory Elliehausen, Consumer Use of Tax Refund Anticipation Loans (Geo. U., Credit Res. Center, Monograph #37, Apr. 2005).
FastFile's Car Dealer Program Details, http://web.archive.org/web/20011214130849/www.fastfile.com/car/progDetails.html (Dec. 14, 2001).
FastFile's Manufactured Housing Program Details, http://web.archive.org/web/20020208132040/www.fastfile.com/manHouse/progDetails.html (Feb. 8, 2002).
Nancy Ferris, Embracing Electronic Commerce, Gov't Executive, Jan. 1998, at 49.
The Financial Post Company, The Financial Post Guide to Investing & Personal Finance: Retirement Planning, Mar. 14, 1998.
Paul Finch & Ray Haynes, Research Isolates Deposit Gains from EFT Technology, Bank SYS. & Equipment., Mar. 1988, at 58.
First Data Corp., Annual Report, at 4, 20 (1998).
Food Stamp Electronic Benefit Transfer Systems: U.S. Dept. Agriculture Rep. to the H Comm. on Agriculture and the S. Comm. on Agriculture, Nutrition, and Forestry (Oct. 2003), available at http://www.fns.usda.gov/FSP/ebt/pdfs/2003_congress.pdf, last updated Jun. 23, 2009.
Food Stamp Program: Frequently Asked Questions About FTP, http://www.fns.usda.gov/fsp/ebt/FAQ.htm.
John R. Galvin, Banc One Corp., Testimony Before the Nat'l Comm'n on Restructuring the I.R.S. (Jan. 30, 1997), available at http://www.house.gov/natcommirs/galvin.htm.
Harold C. Gellis, How to Get Plugged Into Electronic Tax Filing, 1. Accountancy, Jun. 1991, at 56.
Lisbeth K. Green, Payroll Cards: How and Why to Make Them Work For Your Organization, Paytech, Mar. 12, 2002, at 16.
Green v. H&R Block, Inc., 735 A.2d 1039 (Md. 1998).
George Guttman, Electronic Filing: Who Pays, Who Benefits, 66 Tax Notes 1750 (Mar. 20, 1995).
Mike Hogan, Drat! It's Tax Time Again, PC World Online, Dec. 17, 1999, at 1.
Household Bank v. JFS Group, 320 F.3d 1249 (11 th Cir. 2003).
Karen Hube, A Special Summary and Forecast of Federal and State Tax Developments, Wall Street J., Dec. 29, 1999, at AI.
Internal Revenue Service Res. Div., Specifications for Direct Deposit of Individual Income Tax Refunds (Oct. 15, 1986).
Internal Revenue Service Res. Div., Specifications for Electronic Filing of Income Tax Returns (Oct. 15, 1986).
Interpretations—Jan. 1 to Mar. 31, 2002, Off. Comptroller Currency Q. J., Jun. 2003, at 115.
IRS Refund Glitch Sees Banks Stiffed, Associated Press, Feb. 6, 1992, available at http://www.ap.org.
Kelly Jackson, Transmit It To The IRS, Communications Week, Apr. 2, 1990, at 8.
Katy Jacob et al., Stored Value Cards: Challenges and Opportunities for Reaching Emerging Market, Fed. Res. Board, 2005 Res. Conf., available at http://www.ny.frb.orglregional/svc_em.pdf.
David Cay Johnston, Beneficial Sues Over Who Gets IRS Refunds, Oregonian, Feb. 22, 1995, at D2.

David Cay Johnston, Company News: Bank Challenges IR.S. on Refunds for Borrowers, N.Y. Times, Feb. 22, 1995.
Judge Advoc. Gen.'S SCH., Consumer Law Guide, Ch. 6 (Oct. 9, 2003) available at http://web.archive.orglweb/20031009214055/ http://www.louisvillelaw.com/federaVArmy Pubs/JA+265+-+Consumer+Law+Deskbook+(2000).pdf.
Ajit Kambil and James E. Short, Electronic Integration and Business Network Redesign: A Roles-Linkage Perspective, J. MGMT. Info., Spring 1994, at 59.
Howard Karger, America's Growing Fringe Economy, Dollars & Sense Magazine, Nov./Dec. 2006.
Jacob Katy, Stored Value Cards: A Scan of Current Trends and Future Opportunities (Center Fin. Services Innovation, Research Series White Paper No. 1, Jul. 2004).
Charles Keenan, Citi to Issue Debit Cards Through Check Cashers, Am. Banker, Jan. 19, 1999, at 18.
Ted Kemp, Discover Debuts It's First Platinum Card, DMNEWS, Jan. 4, 1999, at 2.
Lenna D. Kennedy, OASDI Beneficiaries and SSI Recipients With Representative Payees, Soc. Security Bull., Winter 1995, at 115.
Andrew Kitching and Sheena Starky, Payday Loan Companies in Canada: Determining the Public Interest, Parliamentary Info. Res. Service, Jan. 26, 2006, available at http://www.parl.gc.ca/information/library/PRBpubs/prb0581-e.html.
James R. Kraus, Beneficial's Tax Refund Lending Program Seen as On-Course After Pullout from Earned Income Side, Am. Banker, Mar. 8, 1995.
Victor Kremer, Finance Co. Readies First Lottery Bonds, Bondweek, Apr. 13, 1998, at 1.
Jeffrey Kutler, Chevron to Take Debit Cards by '92 at Service Stations, Am. Banker, Sep. 7, 1988, at 12.
Jeffrey Kutler, Explore-Cactus Deal is Crowning Glory for Pioneer in Electronic Funds Transfer, Am. Banker, Mar. 11, 1994, at 15.
Jeffrey Kutler, TV Expedites Validation of Visa Charges, Am. Banker, Jul. 20, 1988, at 1.
Letter from Thomas M. Bloch, H&R Block, Inc. to Bernie Radack, Internal Revenue Servo (Mar. 31, 1999).
Diane E. Lewis, It's All in the Card: For Some Employers, Paper is Giving Way to Plastic on Payday, Boston Globe, Feb. 15, 2004.
M2 Presswire, Microsoft: Microsoft Teams With SecureTax. com to Provide Electronic Tax Filing on MSN MoneyCentral, Feb. 19, 1999.
FastFile, Letter and Attachments from Randall Klein, General Manager, Fastfile, to Star Motors (Sep. 28, 1996).
Nelco, Inc. And AM Software, AM Software/Nelco Agreement for 1994 Tax Season, (Sep. 8, 1994).
Beth Stetenfeld, The Power of Electronic Tax Filing, Credit Union MGMT., Oct. 1993, at 32.
Lewis Taub, Is Electronic Filing for You?, Small Bus. Rep., Jan. 1994, at 63.
Tax Max Service Group Inc., TaxMax Auto Dealer Electronic Filing System: 200112002 Tax Season Reference Guide (Revised Sep. 26, 2001).
Tax Refund Services About Us, http://web.archive.org/web/20010815215505/www.taxrefundservices.com/aboutus.htm (Aug. 15, 2001).
Tax Refund Services Car Dealerships, http://web.archive.org/web/2001121609473 5/www.taxrefundservices.com/cardealerships.htm (Dec. 16, 2001).
Tax Refund Services FAQ, http://web.archive.org/web/20010825032936/www.taxrefundservices.com/faq.htm (Aug. 25, 2001).
Tax Refund Services How It Works, http://web.archive.org/web/20010419201 055/www.taxrefundservices.com/howitworks.htm (Apr. 19, 2001).
Tax Refund Services TRS Tax Marketing Program: Making It Easier to Buy a Car, Slide Show and Tax Marketing Agreement, http://web.archive.org/web/20010419201055/www.taxrefundservices.com/howitworks.htm (Apr. 19, 2001).
Tax Refunds for H&R Block Customers, Army Law, Aug. 1989, at 45.
TaxStar's Refund for Down Payment Program, http://dealers.taxstaronline.com, (last accessed Aug. 3, 2009).
TaxStar's Refund for Down Payment Program: Benefits of the Program, TaxStar Dealership Portal, http://dealers.taxstaronline.com/benefits.php (last accessed Aug. 3, 2009).
TaxStar's Tax Refund for Down Payment Program: The Process, TaxStar Dealership Portal, http://dealers.taxstaronline.com/process.php (last accessed Aug. 3, 2009).
Texas Capital Bank Launches New Payroll Platform, Bus. Wire, Nov. 12, 1999, available at http://www.businesswire.com.
The 2004 Federal Reserve Payments Study (Fed. Reserve Sys., Dec. 2004), available at http://www.frbservices.org/files/communications/pdf/research/2004PaymentResearchRep.ort.pdf.
The Price of Loyalty—Safeway Raises the Stakes, Retail Rev., Apr. 1998, at 5.
Turner v. Beneficial Nat'l Bank, No. 98-c-2550, 2003 WL 24280981 (N.D. III. Sep. 10, 2003).
UK Government scraps benefit payment project, Electronic Gov't Int'l, Jun. 1999, at 1.
United States: First Data NTS launches innovative debit card, Electronic Payments Int'l, May 1997, at 3.
U.S. Trademark Serial No. 75/309,970, (filed Jul.. 22, 1999).
U.S. Trademark Serial No. 78/199430 (filed Jan. 2, 2003, first used in commerce Jan. 11, 2001).
Matthew Vadum, Company Cashes in on Lottery Bonanzas, Cent. Penn Bus. J., Apr. 17, 1998, at 4.
Mary Vanac, Florida Car Dealers Will Do Your Taxes, Let You Drive Home in Refund, Knight-Ridder Trib. Bus. News: Akron (Ohio) Beacon J., Mar. 5, 1999.
Virginia Men Implicated in Loan Scheme, Wash. Post, May 24, 1987, at B4.
Visa Taps IFS for Global Cash Card Pilots, Bus. Wire, May 5, 1997, available at http://www.businesswire.com.
Betsy Wade, Practical Traveler; V.A.T. Refunds: Vexations Added, N.Y. Times, Oct. 11, 1998, §5, at 4.
Elspeth Wales, Marriages of convenience, Retail Sys., Sep. 1998, at 18.
Western Union Fin. Serv., Inc. & Basin Indus. Bank, Benefits Quick Cash Agreement and Disclosure Statement (Jun. 1, 1998).
Western Union Fin. Serv., Inc., Benefits Quick Cash Program: Answers, 1998.
Western Union Fin. Serv., Inc. & Basin Indus. Bank, Cash Card Agreement and Disclosure Statement (Sep. 1, 1998).
Western Union Fin. Serv., Inc., Federal Benefits Checks Are Going Away—Don't Let Your Customers Go With Them, 1998.
Western Union Fin. Serv., Inc., Newsbriefs (Spring 1990).
Western Union Fin. Serv., Inc., Only Western Union (product brochure).
Western Union Fin. Serv., Inc., Now When You Need Cash Reachfor the Card, 1998.
Western Union Fin. Serv., Inc., Prepare Now for EBT and Keep Serving Your Customers, 1998.
In re: Western Union Interim Corp. (Fed. Deposit Ins. Corp. Jul. 7, 1998) (Order and Basis for Corporation Approval), available at http://www.fdic.gov/regulations/laws/bankdecisions/merger/westernunion.html.
Louis Whiteman, New Company Targets its Hybrid Debit Card to Unbanked Hispanics, Am. Banker, Jan. 22, 1999, at 6.
Michael F. Lynch, The Age of Electronic Filing, J. Acct., Nov. 1993, at 30.
Gene G. Marcial, Watch Out, H&R Block, Inside Wall Street, Businessweek Online, Nov. 10, 1997.
Steven Marjanovic, Arizona Clearing House Chief Eyes Expansion, Am. Banker, Aug. 18, 1995, at 16.
Laura Lou Meadows, Electronic Filing Speeds Refunds, N.Y. Times, Mar. 5, 1989, § 3, at 27.
Gene Meyer, Block Joins IRS Program to Cut Costs of Fast Refunds: Debt Indicator Will Also Be a Tool in Fighting Fraud, Kansas City Star, Nov. 18, 1999.
Gene Meyer, H&R Block Joins IRS. Program That May Trim Cost of Quick Refunds, Kansas City Star, Nov. 18, 1999.
Ware Myers, On Trial at the Summer Olympics: Smart Cards, Computer, Jul. 1996, at 88.
Timothy J. Mullaney, IR.S. Fraud Watch Cuts Refund Loans, Baltimore Sun, Mar. 12, 1995, at ID.

NaCCA Announces New Debit Card Program, Bus. Wire, Jan. 11, 1999, available at http://www.businesswire.com.
NaCCA, Citigroup Target 'Unbanked', Bank Sys. & Tech., Mar. 1999, at 10.
Nat'l Taxpayer Advocate, 2007 Objectives Report to Congress: vol. II—The Role of the IRS in the Refund Anticipation Loan Industry, Jun. 20, 2006, available at http://www.irs.gov/pub/irs-utl/nta_fy07_final_objectives_reports_071206.pdf.
No. 1 Rated TaxCut Software for the 1999 Tax Year Ships to Retail Stores, Bus. Wire, Dec. 6,1999, available athttp://www.businesswire.com.
Terrence O'Hara, Santa Barbara Bank Decides to Rethink its Refund Anticipation Loan Business, Am. Banker, Jun. 23, 1995, at 6.
Pacific Capital Bancorp, Form 10-Q SEC Filing (May 17, 1999).
Pacific Capital Bancorp, Inc., Form 10-Q SEC Filing (Nov. 15, 1999).
Kelly Palmer, Local Firm Offers Instant Tax Returns, Springfield Bus. J., Jan. 22, 1990, at 1.
James F. Peterson & Keith A. Washington, Why Electronic Tax Filing is Hot, J. Acct., Oct. 1993, at 68.
Jim Peterson, Get with the program! The IRS Elf, Nat'l Pub. Acct., Nov. 1993, at 42.
Maureen Pirog et al., The Expanding Role & Efficacy of E-Government Innovations in US Social Services (Higher Sch. Of Econ., Moscow, Russ., Apr. 2007).
Travis Plunkett, Legislative Dir. Consumer Fed'n of Am., Remarks Before the Senate Comm. on Banking, Housing and Urban Affairs: An Examination of the Gramm Leach Bliley Act Five Years After Its Passage (Jul. 13, 2004).
Marcus Pollet, New plans on the cards, Gov't Computing, Oct. 1996, at 8.
Theodore Postel, Lottery Prize: Assignment of Benefits, Chi. Daily L. Bull., Dec. 19, 1995, at 1.
Press Release, Employee Solutions, Inc., Employee Solutions Partners with Bank One; Plan for a Debit Card Announced (Nov. 12, 1998) (PR Newswire Assoc. Inc.).
Press Release, First Data Corporation, CSRG is First National User of NTS Debit Card for Remote and 'Unbanked' Employees (Aug. 15, 1997) (PR Newswire Assoc. Inc.).
Press Release, H&R Block Inc., H&R Block Tests Low-Rate Credit Card in Select Markets (Mar. 4, 1993) (PR Newswire Assoc. Inc.).
Press Release, H&R Block Inc., H&R Block to Offer Internet Tax Preparation and Electronic Filing at hrblock.com (Nov. 22, 1999) (PR Newswire Assoc. Inc.).
Press Release, Woodbridge Sterling Capital, LLC, Woodbridge Sterling Capital to Issue Securities Backed by Cash Flows From Lottery (Jul. 31, 1997) (PR Newswire Assoc. Inc.).
PR Newswire, Yahoo! Finance Unveils Tax Center, Feb. 1, 1999.
Program Overview—Bank One Visa Cash Cards, http://www.visacash.orgfbankone.html (last visited Nov. 11, 2008).
Bruce Purple, Beneficial National Bank Launches in-Branch Tax Service for Quick refund, Bus. Wire, Jan. 16, 1992, available at http://www.businesswire.com.
Jane Bryant Quinn, Borrowing is Expensive Way to Get Tax Refund Money Fast, Baltimore Sun, Feb. 23, 1998, at 13C.
Jane Bryant Quinn, Separating Fact From Fiction on Federal Checks and Direct Deposit, Wash. Post, Jun. 6, 1999, at H2.
Kristina Rasmussen, From Government's Coffers to Our Wallets: Why Americans Need Choices in Tax Refund Delivery Services (Nat'l Taxpayer's Union, Issue Brief No. 163, Apr. 16, 2007), available at http://www.ntu.org/main/pressJssuebriefs-.printable.php-?PressID=924&org_name=NTU.
Refund Anticipation Loans: Before the Subcomm. On Consumer Credit and Insurance of the H Comm. on Banking, Finance and Urban Affairs, 103rd Congress (1994).
Request to Reopen and Modify Consent Order, In the Matter of Beneficial Corporation, et al., No. D-8922 (F.T.C. May 27, 1986).
Sherris L. Rhine et al., Householder Response to the Earned Income Tax Credit: Path to Sustenance of Road to Asset Building (Fed. Res. Bank N.Y, 2005), available at http://www.chicagofed.orgIcedric/promises-'pitfalls_2005_conference_session2.cfm.
Howard Rudnitsky, Tax Play, Forbes, May 11, 1992, at 48.
Sainsbury Reward Card Extended to More Third Party Retailers, Retail Rev., Jan. 1999, at 12.
Elizabeth R. Schiltz, The Amazing Elastic, Ever-Expanding Exportation Doctrine and Its Effect on Predatory Lending Regulation, 88 Minn. L. Rev. 525 (Feb. 2004).
Robert W. Scott, E-Filing Vendors Outraged Over Death of DDI, Acct. Today, Nov. 21, 1994, at 1.
Silver v. H&R Block, Inc., 105 F.3d 394 (8th Cir. 1997).
Peter Skillern and Adam Rust, The High Cost of Refund Anticipation Loans in North Carolina, Cmty. Reinvestment Ass'n. of N.C. (Jan. 25, 2007), available at http://www.ncimed.com/docs/2006_RALReport.pdf.
Slow roll out, and still thin on the ground, Gov't Computing, Jan. 1999, at 24.
Smart City, Govt Computing, Sept. 1999, at 10.
Social Security Beneficiaries Enrolled in the Direct Deposit Program, Dec. 1996, Soc., Soc. Security Bull, Jan. 1998, at 52.
State Recognition of Paycards (Am. Payroll Assoc., Feb. 2008).
Michael A. Stegman et al., The State of Electronic Benefit Transfer (EBT) (Dec. 2003) (on file with Center for Community Capitalism: The University of North Carolina at Chapel Hill).
A Summary of the Roundtable Discussion on Stored-Value Cards and Other Prepaid Products, Fed. Res. Board, http://federalreserve.gov/paymentsystems/storedvalue/, last updated Jan. 12, 2005.
All for one—but not yet one for all, Loc. Gov't It Use, Mar./Apr. 1999, at 17.
Amended and Restated Refund Anticipation Loan Participation Agreement, Jan. 2003, available at: http://contracts.onecle.com/hrblock/household.loan.2003_.0_1.06.shtmi.
Am-Tax Professional 1040, Accounting Technology, Oct. 1998 at 30.
Christoslav Anguelov et al., U.S. Consumers and Electronic Banking: 1995-2003, Fed. Res. Bull, Winter 2004, at 1-18.
Antoinette Alexander, The Internet Rules Tax Filing Season, Acct. Tech., Jan./Feb. 2000, at 52.
Joanne Ball Artis, Fees for Speedy Tax Refunds Decried for High Interest Rate Tax Filing Firm Defends Practice as a Favor to Consumer, Boston Globe, Feb. 17, 1993, at 7.
Bank Card Report: POS: Is the Future Now?, ABA Banking J., Sep. 1986, at 66.
Bank machine benefits offer, Gov't Computing, Dec. 1998, at 8.
Michael S. Barr, Banking the Poor (Univ. Mich. Law Sch., Working Paper No. 49, 2004).
Matt Barthel, Star's Explore Unit Merging With Cactus POS Network, Am. Banker, Mar. 11, 1994, at 1.
Jennifer Bayot, For Some Taxpayers the Refund is in the Plastic, N.Y. Times, Feb. 1, 2004, at BU8.
Beckett v. H&R Block, Inc., No. 94-C-776, 1994 WL 698505 (N.D. III. Dec. 12, 1994).
Eamon Beltran, H&R Block to Enhance Tax, Financial Services, Dow Jones News Service, Nov. 17, 1999.
Tom Bengston, W. Union Reaches the Unbanked with Quick Cash, N. W. Fin. Rev., Jun. 27, 1998, available at http://findarticles.comlp/articles/mtqa3799/is_199806/ai_n87953_75/print?tag=artBody;c 011.
Alan Berube et al., The Price of Paying Taxes: How Tax Preparation and Refund Loan Fees Erode the Benefits of EITC, The Brookings Inst., Progressive Policy Inst., May 2002, available at http://www.brookings.edu/reports/2002/05taxes_eitc.aspx.
Sondra G. Beverly and Coleen Dailey, Using Tax Refunds to Promote Asset Building in Low-Income Households: Program and Policy Options, Center for Soc. Dev., George Warren Brown School of Soc. Work, Wash. D., Oct. 2003, available at http://gwbweb.vvustl.edu/csd/Publications/2003/PolicyReport-TaxRefund.pdf.
Blair's citizen card scheme, Gov't Computing, Nov. 1998, at 5.
Joseph Bondar, Social Security Beneficiaries Enrolled in the Direct Deposit Program, Dec. 1996, Aug. 1998, at 52.
Bill Brandel, Micro-To-Host Links: Data Link Speeds Tax Filing, Refunds, Computerworld, Mar. 28, 1988, at S7.
Lynn Brenner, NY Thrift Promotes Tax Services Dollar Dry Dock Offers Refund in Advance of IRS Payment, Am. Banker, Feb. 2, 1989, at 10.
Scott Bronstein, A Check-Writing Nation Ignores the Debit Card, N.Y. Times, Oct. 6, 1985, § 3, at 12.

Amy Brown et al., Refund Loan Products and VITA: A Summary of Issues and Options, Nov. 2004, http://www.responsiblelending.orglpdfs/RALs-Summary-1104.pdf.

Jim Brown, Ways to Pay, Network World, Aug. 29, 1988, at 29.

Businesswire, Sweepstakes and Free Refund Estimation Highlight SecureTax Incentives, Jan. 13, 1998.

Carbiz.com Inc., Annual Report, Form 20-F SEC Filing (Jan. 31, 2000).

Carbiz.com Acquires Tax Max Service Group Inc., Carbiz.com Inc., Apr. 25, 2000, http://www.carbiz.comIShowRelease.asp?RecordID=43.

Carbiz. corn Acquires Tax Max Service Group Inc., The Auto Channel, Apr. 25, 2000, http://www.theautochannel.cornlnews/press/date/20000425/press013905.html.

CashMoney®, http://www.cashmoney.ca/main.html (last visited Nov. 10, 2008).

Brian Cayton, Low-Cost Software Open New Windows On Financial Planning, Accounting Technology, Jul. 1996.

Cendant's Juggernaut: The Growth of the World's Largest Real Estate Company, Oct. 11, 1997, available at http://74.125.45.104/search?q=cache:nn_KrnE45prcJ:www.remaxcahi.com/esource/franchisee/forms/cendant.pdf+%E2%80%A2+Cendant%E2%80%99s+Juggernaut,+Oct.+11,+1997&hl=en&ct=clnk&cd=1&gl=us.

Julia S. Cheney, Payment Cards and the Unbanked: Prospects and Challenges, Fed. Res. Bank Philadelphia, Jul. 13-14, 2005, available at http://www.philadelphiafed.org/payment-cardscenter/events/conferences/2005/PaymentCardsandtheUnbankedSummary.pdf.

Julia S. Cheney, Prepaid Card Models: A Study in Diversity, Fed. Res. Bank Philadelphia, Mar. 2005, available at http://www.philadelphiafed.org/payment-cardscenter/publications/discussion-papers/2005/PrepaidCardModels_Palmer_FINAL.pdf.

Prepay? ABA Banking Journal, vol. 86, No. 471 72, Apr. 1994.

Citibank Joins Efforts to Assist 'Unbanked', Bank Tech. News, Jan. 1999, at 23.

Paul Clolery, H&R Block Tests Mastercard: AICPA's New Card Adds Benefits, Prac. Acct., May 1993, at 10.

Steve Cocheo, Beneficial parentage, ABA Banking J., Jul. 1997, at 44.

Michael Cohn, Linking Planning to Tax Prep, Accounting Technology, Feb./Mar. 1997, at 49-56.

Michael Cohn, Tax Prep Software 1040 Tax Prep Update, Accounting Technology, Feb. 1995, at 27-34.

Shawn Allen Cole et al., Where Does It Go? Spending by the Financially Constrained (Harv. Bus. Sch. Fin., Working Paper No. 08-083, Apr. 11, 2008).

Colorado v. Cash Now Store, Inc., 12 P.3d 321 (Colo. Ct. App. 2000).

Consultation Paper on Framework Options for Addressing Concerns with the Alternative Consumer Credit Market, ACCM Working Group, Consumer Measures Committee, Autumn 2002, available at http://cmcweb.ca/epic/site/cmccmc.nsf/vwapj/CMC_credit_e.pdf/$FILE/CMC_credit_e.pdf.

Consumer Action News: EBT/EFT Update (1998), Jul. 1, 1998, http://www.consumeraction.org/news/articles/ebt_eft_update_1998/.

Antoinette Coulton, Nations Bank Testing Visa Cash at Air Force Base, Am. Banker, Jul. 15, 1998, at 13.

Council plans bank machine pay-outs, Gov't Computing, Feb. 1999, at 5.

Eileen Courter, Debit Cards Come of Age, Credit Union Mgmt., Feb. 1996, at 36.

Debit Payoff, Card Fax, Nov. 13, 1998, at 2.

Paul Demery, Tax Planning Draws a Crowd—Tax Software Vendors Compete in What Was Once a One-Horse Race, Accounting Technology, Dec. 1998.

Dey Delrio and Chris Kelley, A Primer on Fringe Products Associated with RALs, Nov. 2004, http://www.responsiblelending.org/issus/refund/briefs/.

Discover's Platinum May Stand Out in the Platinum Crowd, Credit Card News, Jan. 15, 1999.

\* cited by examiner

SPENDING VEHICLES FOR PAYMENTS

CROSS REFERENCES TO RELATED APPLICATIONS

This application is a continuation application of U.S. patent application Ser. No. 09/483,537, entitled SPENDING VEHICLES FOR PAYMENTS filed on Jan. 14, 2000, now U.S. Pat. No. 7,072,862, issued Jul. 4, 2006. This application is a continuation-in-part of U.S. patent application Ser. No. 09/354,870, entitled TAX REFUND SYSTEM filed Jul. 16, 1999, now U.S. Pat. No. 7,177,829, issued Feb. 13, 2007.

BACKGROUND AND SUMMARY OF THE INVENTION

The present invention relates generally to a system and method for distributing payments to individuals and, more particularly, to a system and method for allocating a portion or all of an individual's payment into a spending vehicle.

Participants in many government and corporate sponsored programs are entitled to regular or periodic payments. For example, in government sponsored welfare programs such as Aid to Dependent Children and retirement programs such as Social Security, beneficiaries may receive monthly payments. Individuals who make regular IRA contributions during their working years may receive monthly or yearly distributions during their retirement years. Employees who participate in their employers' retirement programs such as 401(K) plans, may also receive monthly or yearly distributions during their retirement years. Individuals who participate in other savings and investment plans may receive regular or periodic dividend payments.

Individuals who receive periodic or regular payments from various government and corporate plans or programs typically receive a check from the plan or program administrator. Alternatively, individuals may arrange for an electronic funds transfer ("EFT") payment. In either case, the individuals receive cash payments. Individuals are then free to use the cash as desired.

Although the cash payments provide individuals with flexibility in making purchases, the overall purchasing power available to the individuals is equivalent to the dollar amount of cash payment. Alternatives to cash payments could provide individuals with increased purchasing power. For example, if instead of receiving a cash payment, an individual had the option of receiving a coupon from a retailer for an amount greater than the value of the cash payment, the individual would receive the benefit of increased purchasing power. Therefore, there is a need for a system and method by which individuals may select among alternatives to receiving cash payments.

The present invention provides a system and method for associating payments with spending vehicles so that an individual who is entitled to receive regular or periodic payments (e.g., Social Security checks, 401(k) distributions, dividend payments, tax refunds, payroll checks or deposits, private payment arrangements, or any other source of payment(s)) may choose to receive in place of the payment a spending vehicle such as a credit card, debit card, e-wallet account, gift card, discount card, rebate, coupon for use with purchases of the sponsor's products or services, or anything of value to the payee which the payee agrees to accept in this form instead of receiving a regular payment by check or cash or by direct deposit. Sponsors may include companies and organizations interested in offering purchase incentives to their customers. For example, sponsors may be retailers, manufacturers, or service providers. An individual who wishes to receive a spending vehicle rather than the regular payment selects the spending vehicle he or she would like to receive and assigns his or her right to receive the payment to a third party. The third party assignee may be a sponsor offering a spending vehicle or it may be a financial institution that serves as intermediary between an individual and a sponsor. If a sponsor offers the spending vehicle, the sponsor arranges to give a spending vehicle to the individual in return for an assignment of the individual's right to payment. If the spending vehicle is offered by a financial institution, the financial institution then arranges to give a spending vehicle to the individual and to transfer all or a portion of the individual's payment to the sponsor of the spending vehicle. The financial institution may take a portion of the individual's payment as compensation for the service provided to the individual and the sponsor. Alternatively, the financial institution may offer its own spending vehicle or it may purchase spending vehicles from various sponsors so that only one payment for purchase of the spending vehicles is made.

In a preferred embodiment of the present invention, the dollar value of the spending vehicle received by an individual is greater than the dollar value of the cash payment the individual would have received. Consumers of the present invention therefore benefit by increasing their purchasing power. Alternatively, the dollar value of the spending vehicle may be equivalent to or less than the dollar value of the cash payment the individual would have received. In this embodiment of the present invention, consumers benefit from the convenience of receiving a spending vehicle for use with purchases at their preferred sponsors. Sponsors benefit from the present invention through increased customer bases and additional traffic. They further benefit from increased sales of their products and services. Payors who make payments available to individuals benefit from an increase in the use of electronic funds transfers and a reduction in the printing and mailing of checks to individuals.

The present invention will be described in greater detail hereinafter. The present invention is described in the form of preferred embodiments and is not to be limited to those preferred embodiments but instead shall be given the broadest scope of protection affordable under the law in view of the allowed claims.

DETAILED DESCRIPTION OF PREFERRED EMBODIMENT(S)

Figure 1:
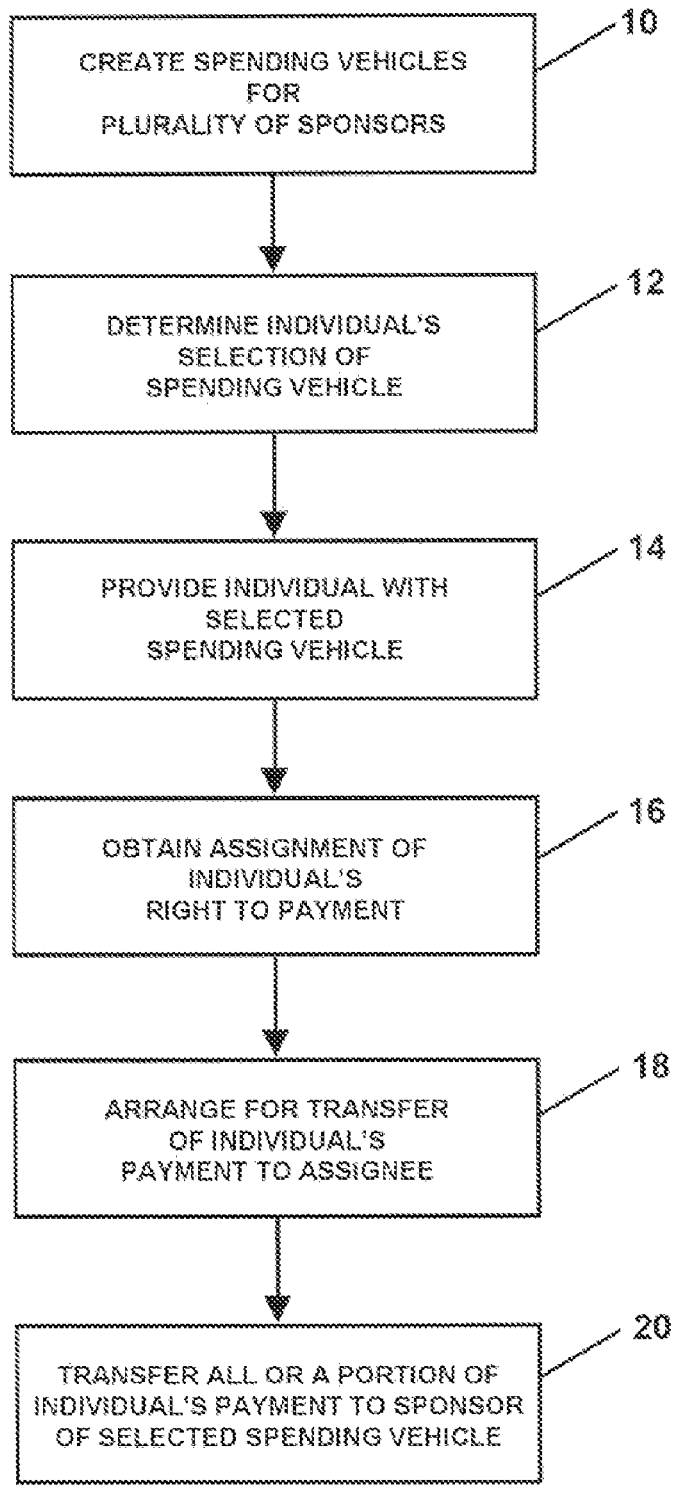
FIG. 1 is a flow diagram of a preferred embodiment of the present invention.

Referring now to the drawings, there is shown in FIG. 1 a flow diagram for a preferred embodiment of the system of the present invention. Steps to accomplish a preferred embodiment of the present invention are shown in FIG. 1. In the first step 10, a plurality of spending vehicles for a plurality of sponsors is created. A spending vehicle may be a credit card, debit card, cash card, checking card, spending account, checking account, e-wallet account, gift card, discount card, rebate, coupon, voucher or any other type of financial instrument or currency that enables the holder of the spending vehicle to purchase products or services. A sponsor may be a retailer, financial institution, service provider, wholesaler, distributor, manufacturer, entertainment entity, travel entity, publisher, governmental entity, insurance institution, brokerage institution, global computer network and online business, consortium of companies, or any participating entity through which an individual may purchase something of value to the individual. A sponsor participating in the system and method of the present invention may choose to offer one or more spending vehicles to its customers.

In the next step 12, the individual's selection of a spending vehicle is determined. The individual may be given the option of selecting more than one spending vehicle from one or more sponsors. Next 14, the individual is provided with the spending vehicle or vehicles selected. In exchange for the spending vehicle, the individual assigns his or her right to a payment to a third party in step 14. In one embodiment of the present invention, the individual assigns his or her right to payment directly to the sponsor who provided the spending vehicle. The individual may arrange to transfer the full amount or less than the full amount of the payment to the sponsor. The sponsor then provides one or more of its own spending vehicles to the individual with a value based on the amount of the payment assigned to the sponsor. In this embodiment, the sponsor provides a spending vehicle to the individual directly without the need of an intermediate entity such as a financial institution. The sponsor may be a financial institution. Alternatively, the individual may assign his or her right to payment to a financial institution. In this embodiment of the present invention, the financial institution may serve as an intermediary between a plurality of sponsors and an individual. The financial institution may then offer more types of spending vehicles from more sponsors thereby giving the individual more options than may be available from a single sponsor. Once the assignment is complete, the assignee of the individual's right to payment, (e.g., the sponsor or financial institution) arranges to receive the individual's payment in step 18. In step 20, if an intermediary such as a financial institution is the assignee of the right to payment, a portion or all of the payment may then be transferred to the sponsor or sponsors from whom the individual selected the spending vehicle. In order to accomplish the transfer of funds, a third party payor may arrange to transfer the individual's payment to a sponsor or financial institution entitled to receive the individual's payment based on the assignment.

Figure 2:
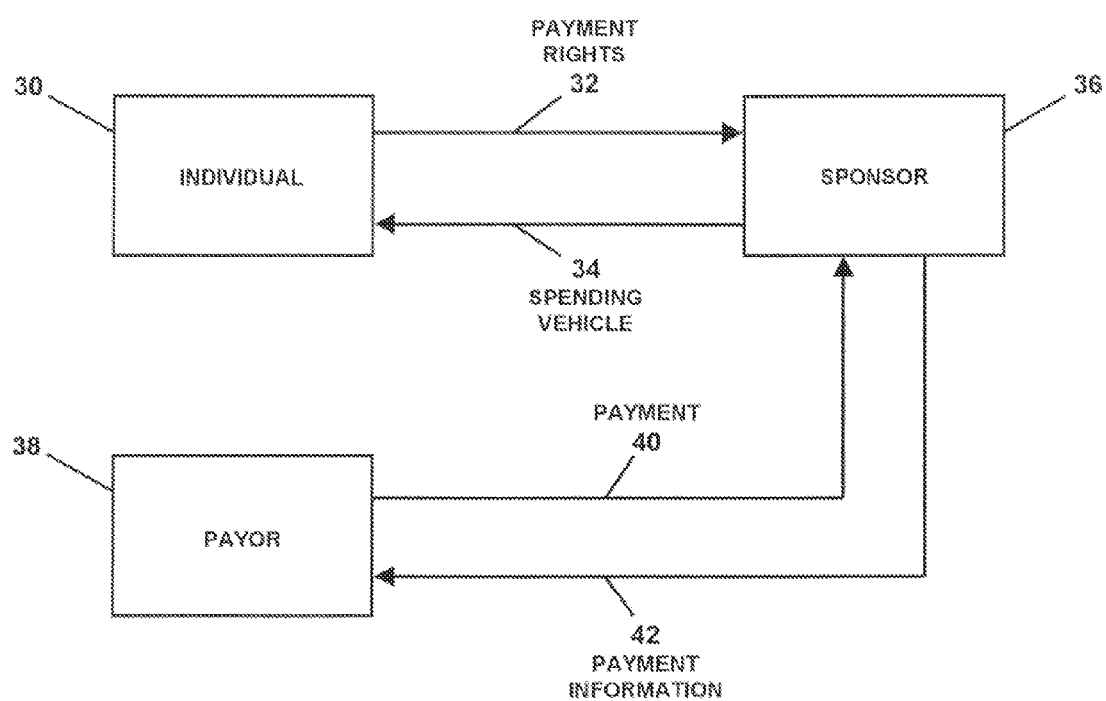
FIG. 2 is a schematic diagram of a first preferred embodiment of the present invention.

Referring to FIG. 2, an embodiment of the present invention in which an individual 30 obtains a spending vehicle 34 directly from a spending vehicle provider such as a sponsor 36 is shown. In exchange for the assignment of the payment rights 32 by the individual 30 to the sponsor 36, the spending vehicle provider or sponsor (i.e., third party assignee) provides a spending vehicle 34 to the individual 30. Information regarding the arrangement between the individual 30 and sponsor 36 may then be communicated with the third party payor from whom the individual is entitled to receive a payment. Payment information 42 such as name and account information may be transferred from the sponsor 36 to the third party payor 38 so that the sponsor 36 receives the individual's payment 40 directly. The payor may use electronic funds transfer to accomplish the transfer so that it is not required to process a check or other form of payment to the individual.

In accordance with the present invention, for example, an individual may assign his or her Social Security check to a retailer and in exchange for the right to receive the individual's check, the retailer provides the individual with a spending vehicle such as a credit card or debit card with a predetermined amount of spending power for use at various outlets. The retailer spending vehicle may include an amount of buying power greater than the amount of the Social Security check. For example, a retailer may issue a special debit card worth $500 in exchange for receiving the individual's check of $450. The benefit to the retailer is that the individual must spend his or her Social Security dollars at the retailer's store (s), and the benefit to the individual may be that the retailer offers buying power at the retailer's store(s) in excess of the dollar amount of the Social Security check.

Under a preferred embodiment of the present invention, the spending vehicle provider or sponsor may issue, for example, a debit card to an individual upon receiving confirmation of the receipt of the Social Security check. The credit card or debit card may not be activated until such time as the spending vehicle provider receives the funds for the check. The spending vehicle may include a telephone number for an individual to call to activate the spending vehicle once the spending vehicle provider is assured of receipt of payment. Once the individual's spending vehicle is activated, the individual may spend the value of the spending vehicle. For example, an individual who is entitled to receive a $450 Social Security check may assign that amount to a spending vehicle provider in exchange for $500 of spending power through a debit card good only at a particular retailer or at some group of retailers. In another example, an individual who is due an IRA distribution of $2,500 may assign his or her distribution amount to an automobile dealer in exchange for the automobile dealer issuing a spending vehicle worth $3,000 in buying power at the auto dealership. In another example, a cruise line may offer a spending vehicle of $3,000 in exchange for receiving the individual's distribution amount of $2,500.

The spending vehicle may take the form of many different embodiments, including but not limited to, credit cards, debit cards, cash cards, checking cards, spending accounts, checking accounts, electronic spending accounts, coupons, vouchers, discount certificates, rebate certificates, and any other vehicle in which an individual receives spending power in a particular dollar amount useable at practically any participating retailer, financial institution, service provider, wholesaler, distributor, manufacturer, entertainment entity, travel entity, publisher, governmental entity, insurance institution, brokerage institution, global computer network and online business, and any participating entity through which an individual may purchase something of value to the individual. A payment may be any type of regular or periodic payment such as a government, corporate, or employer benefit. It may also be a special one-time payment such as a tax refund or a special dividend payment from an investment.

Figure 3:
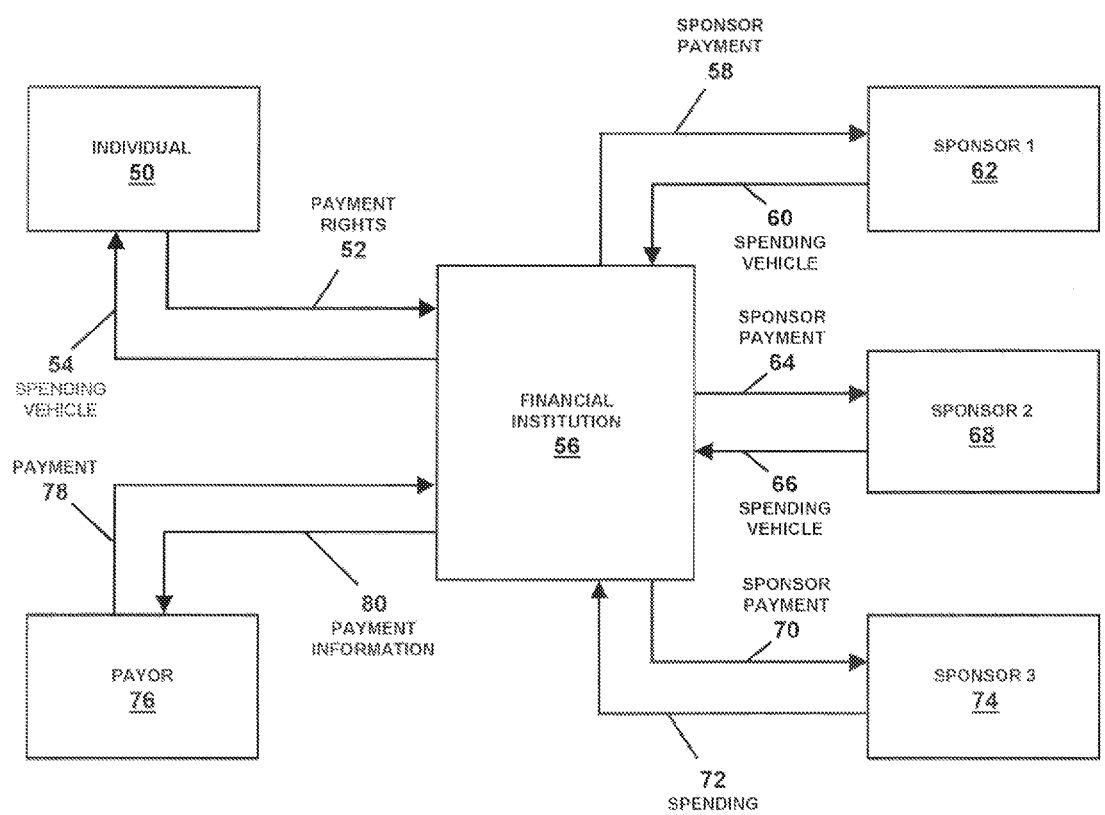
FIG. 3 is a schematic diagram of a second preferred embodiment of the present invention.

Referring to FIG. 3, use of a financial institution 56 as an intermediary or middleman between the individual 50, the payor 76 from whom the individual 50 is entitled to receive a payment, and the spending vehicle provider(s) or sponsor(s) 62, 68, 74 may be preferable. For example, financial institutions are typically well established in providing spending vehicles such as credit cards and debit cards. A retailer, for example, may find it helpful to provide its own spending vehicle if done in conjunction with a financial institution.

As shown in FIG. 3, a financial institution 56 may work with a plurality of sponsors 62, 68, 74 so that an individual 50 is provided with several options for selecting a spending vehicle. The financial institution 56 may arrange to obtain a plurality of spending vehicles 60, 66, 72 from a plurality of sponsors 62, 68, 74. As indicated above, the spending vehicles 60, 66, 72 may be credit cards, debit cards, cash cards, checking cards, spending accounts, checking accounts, electronic spending accounts, coupons, vouchers, discount certificates, or rebate certificates. The individual 50 assigns his or her payment rights 52 to a financial institution 56 and selects one or more spending vehicles 54 from one or more of the sponsors 62, 68, 74. The individual may assign the full or less the full amount of the payment to the financial institution. The financial institution may arrange to receive the appropriate amount of the individual's payment 78 by providing payment information 80 to the third party payor 76 from whom the individual is entitled to receive a payment. As indicated above, the payor 76 may be a governmental agency, an employer, or any institution that provides payments to individuals in accordance with instructions from a governmental agency, corporation, organization, employer, etc. The payment 78 may be a Social Security check, 401(k) distribution, dividend payment, tax refund, etc. The financial institution 56 may then arrange to transfer to each participating sponsor 62, 68, 74 all or a portion of the individual's payment 78. The financial institution 56 may keep a portion of each individual's payment as a fee for allowing sponsor participation. Preferably, the value of the spending vehicle 54 selected by the individual 50 exceeds the value of the payment right 52 transferred to the financial institution. In this arrangement, individuals benefit from the increased spending power available from the various sponsors. While financial institutions may be beneficial to the process of the present invention, they are not essential.

Figure 4:
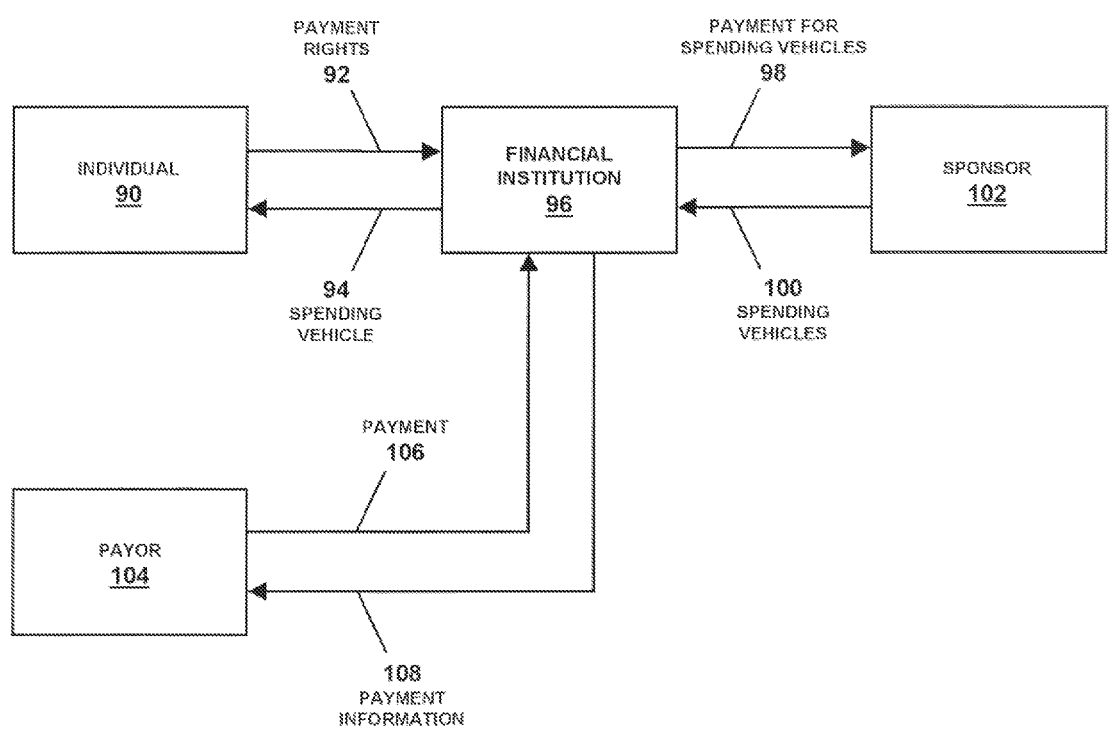
FIG. 4 is a schematic diagram of a third preferred embodiment of the present invention.

FIG. 4 shows another embodiment of the present invention in which a financial institution 96 purchases spending vehicles from a sponsor 102. In this embodiment of the present invention, a financial institution 96 may make a payment of a lump sum or fixed amount 98 to a sponsor 102 in return for a plurality of spending vehicles 100. The financial institution 96 may then distribute one of the spending vehicles 94 to an individual 90 in exchange for the right to receive a payment 92 from the individual or individual's payor 104. Payment information 108 provided by the financial institution 96 to the payor 104 may then be used to transfer the individual's payment 106 directly to the financial institution 96. An electronic funds transfer may be used to complete the transaction so the payor is relieved of the burden of processing a check payment to the individual.

In accordance with this embodiment of the present invention, a financial institution 96, for example, may purchase $5,000 worth of coupons for $4,000. The financial institution 96 may then sell the coupons to individuals for slightly less than the face value of each coupon but for more than it paid for each coupon. Under this arrangement, the sponsor benefits from the lump sum payment and increased sales due to the distribution of the coupons to potential customers while the financial institution benefits by selling the coupons for less than its purchase price. Individuals benefit from the increased spending power at the participating sponsor. In addition, the financial institution is not required to transfer any portion of the individual's payment to the sponsor.

Figure 5:
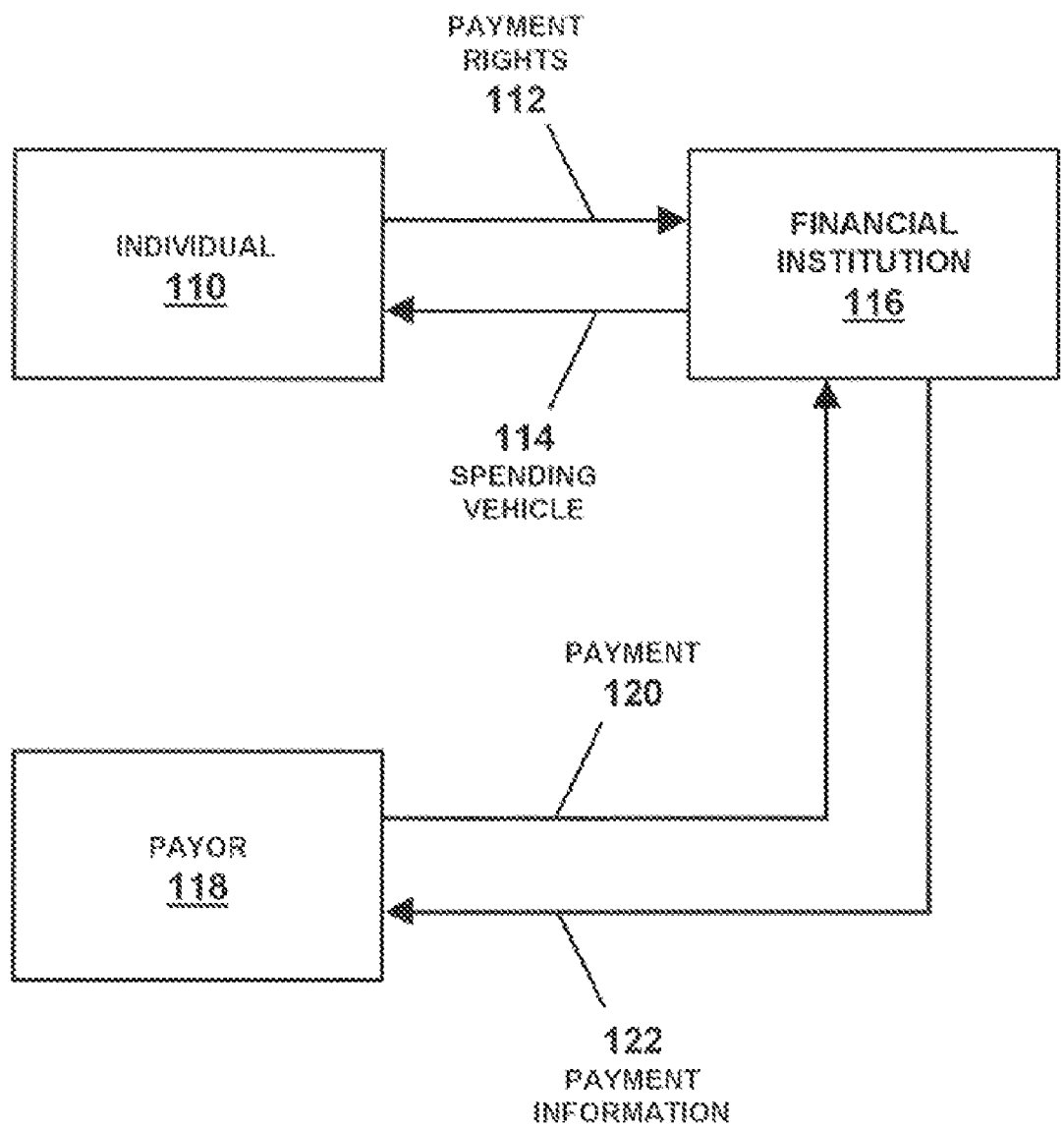
FIG. 5 is a schematic diagram of a fourth preferred embodiment of the present invention.

FIG. 5 shows another embodiment of the present invention in which a particular third party spending vehicle provider is not necessary. Instead, a financial institution 116 (perhaps the bank where the individual banks), for example, issues a spending vehicle 114 directly to the individual 110 that may be used at many different outlets for the purchase of goods and or services. In return for the spending vehicle 114, the individual 110 assigns payment rights 112, which may be any amount equal to or less than the amount of the payment, directly to the financial institution 116. The financial institution 116 receives the appropriate amount for the individual's payment 120 from the third party payor 118 after providing necessary payment information 122 to the payor 118. The payment information may include name and account information so that an electronic funds transfer may be completed.

Once the individual receives the spending vehicle and the individual has completed any process for activating the spending vehicle, the individual may spend the dollar amount of value inherent in that individual's spending vehicle through participating sponsor or sales outlets. Furthermore, the spending vehicle provider or sponsor may agree to assign its rights and obligations in the spending vehicle to another entity at which the individual may spend or obtain the unspent dollar amount of the spending vehicle. The individual is therefore given even greater flexibility in using the selected spending vehicle.

Once the spending vehicle is activated for the individual, in a preferred embodiment of the present invention, the individual may be given a period of time in which to use the spending vehicle before a service charge is applied. For example, the individual may incur no service charge on the spending vehicle if the spending vehicle is used within 90 days of being activated. In the event a minimum balance remains in the spending vehicle after the initial "no fee" period, a small monthly service charge may be levied against the spending vehicle until it is entirely used. Alternatively, after a period of time (e.g., 60 days) the spending vehicle provider may issue a check to the individual for the balance left in the spending vehicle. These alternatives provide the individual with greater flexibility in using the selected spending vehicle.

Having shown and described a preferred embodiment of the present invention, those skilled in the art will realize that many variations and modifications may be made to the described invention and still be within the scope of the claimed invention. Thus many of the elements indicated above may be altered or replaced by different elements which will provide the same or substantially the same result and fall within the spirit of the claimed invention. It is the intention therefore to limit the invention only as indicated by the scope of the claims.

What is claimed is:

1. A computerized system for distributing a spending vehicle, comprising:

a spending vehicle having a predetermined value;

a right of an individual to receive a payment from a payor;

an assignment executed by said individual wherein said individual agrees to transfer a portion of said payment from said payor to a third party acquiring said right to receive said at least said portion of said payment;

a payor computer system for receiving payment data to facilitate electronically transferring said portion of said payment from said payor computer system to a third party computer system, said third party acquiring said right to receive said at least said portion of said payment; and wherein:

(1) said spending vehicle is provided to said individual by said third party acquiring said right in exchange for said right to receive said at least said portion of said payment; and (2) data regarding said spending vehicle provided to said individual is recorded in said third party computer system.

2. The computerized system of claim 1 wherein said spending vehicle is selected from the group consisting of:

a gift card, a cash card, a coupon, a voucher, a rebate certificate, and a discount certificate.

3. The computerized system of claim 1 wherein said spending vehicle is selected from the group consisting of:

a credit card, a debit card, a checking card, a checking account, a discount, a discount certificate, a spending account, an electronic spending account, and an e-wallet account.

4. The computerized system of claim 1 wherein said spending vehicle is offered by a sponsor selected from the group consisting of:

a product retailer, a wholesaler, a distributor, a manufacturer, a service provider, a publisher, a travel entity, an entertainment entity, a financial institution, an insurance institution, a brokerage institution, a global computer network and online business, a publisher, and a consortium of companies.

5. The computerized system of claim 4 wherein said third party acquiring said right to receive at least said portion of said payment is said spending vehicle sponsor.

6. The computerized system of claim 1 wherein said third party acquiring said right to receive at least said portion of said payment is a financial institution that accepts said transfer of said at least a portion of said payment and takes a portion of said at least a portion of said payment as compensation for services.

7. The computerized system of claim 1 wherein said payment is selected from the group consisting of:

a government program payment and a corporate program payment.

8. The computerized system of claim 1 wherein said payment is selected from the group consisting of:

an aid to dependent children payment, a social security payment, a tax refund, an individual retirement account distribution, a 401(K) distribution, an interest payment, and a dividend payment.

9. The computerized system of claim 1 wherein said predetermined value of said spending vehicle is in an amount equal to said at least a portion of said payment.

10. The computerized system of claim 1 wherein said predetermined value of said spending vehicle is in an amount greater than said at least said portion of said payment.

11. The computerized system of claim 1 wherein said predetermined value of said spending vehicle is indicated by said individual.

12. The computerized system of claim 1 wherein said third party acquiring said right to receive said at least said portion of said payment is a third party assignee selected from the group consisting of:

a spending vehicle sponsor and a financial institution serving as an intermediary between said individual and a spending vehicle sponsor.

* * * * *